(12) United States Patent
Mooneyham

(10) Patent No.: US 8,543,550 B2
(45) Date of Patent: Sep. 24, 2013

(54) PRIORITIZED DIGITAL MEDIA ARCHIVING

(75) Inventor: Mark Randall Mooneyham, Folsom, CA (US)

(73) Assignee: Adobe Systems Incorporated, San Jose, CA (US)

( * ) Notice: Subject to any disclaimer, the term of this patent is extended or adjusted under 35 U.S.C. 154(b) by 110 days.

(21) Appl. No.: 13/153,344

(22) Filed: Jun. 3, 2011

(65) Prior Publication Data

US 2013/0132350 A1    May 23, 2013

(51) Int. Cl.
*G06F 7/00*    (2006.01)
*G06F 17/30*    (2006.01)

(52) U.S. Cl.
USPC ........... 707/665; 707/640; 707/661; 711/161; 711/162

(58) Field of Classification Search
None
See application file for complete search history.

(56) References Cited

U.S. PATENT DOCUMENTS

| | | | |
|---|---|---|---|
| 7,418,531 B2 | 8/2008 | Brewer et al. | |
| 7,440,436 B2 * | 10/2008 | Cheng et al. | 370/338 |
| 8,375,005 B1 * | 2/2013 | Claudatos et al. | 707/654 |
| 2005/0086240 A1 * | 4/2005 | Richardson et al. | 707/100 |
| 2005/0204104 A1 * | 9/2005 | Aoshima et al. | 711/161 |
| 2008/0005508 A1 * | 1/2008 | Asano et al. | 711/161 |
| 2008/0005695 A1 | 1/2008 | Ozzie | |
| 2008/0091745 A1 | 4/2008 | Malik | |
| 2009/0125506 A1 | 5/2009 | Kim | |
| 2009/0157991 A1 * | 6/2009 | Rajan et al. | 711/162 |
| 2009/0164741 A1 * | 6/2009 | Takaki | 711/158 |
| 2011/0107043 A1 * | 5/2011 | Palagummi | 711/162 |
| 2011/0135284 A1 * | 6/2011 | Martch et al. | 386/297 |

* cited by examiner

*Primary Examiner* — Sangwoo Ahn
(74) *Attorney, Agent, or Firm* — Wolfe-SBMC

(57) ABSTRACT

An investment value of a media file is automatically determined by recording an interaction with the media file. Further, a uniqueness value of the media file is automatically determined by determining a probability that the media file is irreplaceable. In addition, an archival prioritization of the media file is performed in comparison with an additional media file. An archival storage device stores the media file if the archival storage device has space to accommodate the media file and the media file has a higher archival prioritization than the additional media file.

19 Claims, 5 Drawing Sheets

PRIORITIZED DIGITAL MEDIA ARCHIVING

BACKGROUND

1. Field

This disclosure generally relates to digital media. More particularly, the disclosure relates to digital media archiving.

2. General Background

The quantity and size of the digital media files utilized by consumers is rapidly increasing at an exponential rate. Many users are now storing vast amounts of digital media files such as images and video with higher resolutions and larger file sizes. With the decline of analog imaging, the digital form of the images and videos is increasingly the "original." Further, the exponential increase in quantity means that, as a percentage, the chance of any piece of digital media having been output in physical form is becoming quite small. In addition, magnetic storage has reached the three TeraByte per device level and continues to increase at a fast pace. These trends have led to a situation in which users are storing an increasing quantity of digital media files on drives with increasing storage space. Further, the user is unlikely to back up those digital media files given the increasing quantity of digital media files. As a result, the chance of an error eventually developing with the digital media is currently larger than fifty percent. In addition, the profusion of devices that can capture, store, and process media provides increasing difficulty for users with respect to managing all of their files. Further, transferring files to the cloud is becoming more problematic as a result of bandwidth providers capping bandwidth usage. Therefore, archiving digital media files is becoming increasingly difficult and expensive.

Many current archiving systems generally do not have capacity to prioritize files. The few systems that do have capacity typically utilize the same approaches that a hard drive data caching system may employ to improve access times. For example, these approaches rely on recency of access or a combination of recency of access and frequency of access to determine what data should be prioritized. As a result, a media archiving system may sort the files that were created most recently or most frequently for archiving. However, with respect to media files, such a media archiving system may assign the wrong files the highest priorities.

Other current approaches generally assume that all data should be archived. However, current data limit constraints on bandwidth imposed by broadband providers in both consumer and enterprise configurations simply make those approaches infeasible.

SUMMARY

In one aspect of the disclosure, a computer program product is provided. The computer program product includes a computer useable medium having a computer readable program. The computer readable program when executed on a computer causes the computer to determine an investment value of a media file by recording an interaction with the media file. Further, the computer readable program when executed on the computer causes the computer to determine a uniqueness value of the media file by determining a probability that the media file is irreplaceable. In addition, the computer readable program when executed on a computer causes the computer to perform an archival prioritization of the media file in comparison with an additional media file. The computer readable program when executed on the computer also causes the computer to store the media file in an archival storage device if the archival storage device has space to accommodate the media file and the media file has a higher archival prioritization than the additional media file.

In another aspect of the disclosure, a process is provided. The process determines, with a processor, a first safety value of a media file at a first device connected to a network based on a first type of the first device. Further, the process determines, with the processor, a second safety value of the media file at the second device connected to the network based on a second type of the second device. In addition, the process calculates, with the processor, a replication count that is a sum of the first safety value and the second safety value. The process also performs an archival prioritization of the media file in comparison with an additional media file if the replication count is less than a predetermined safety threshold. Further, the process stores the media file in an archival storage device if the archival storage device has space to accommodate the media file and the media file has a higher archival prioritization than the additional media file.

In yet another aspect of the disclosure, a system is provided. The system includes a processor that determines an investment value of a media file by recording an interaction with the media file, determines a uniqueness value of the media file by determining a probability that the media file is irreplaceable, and performs an archival prioritization of the media file in comparison with an additional media file. Further, the system includes an archival storage device that stores the media file if the archival storage device has space to accommodate the media file and the media file has a higher archival prioritization than the additional media file.

DRAWINGS

The above-mentioned features of the present disclosure will become more apparent with reference to the following description taken in conjunction with the accompanying drawings wherein like reference numerals denote like elements and in which.

DETAILED DESCRIPTION

Digital media assets are prioritized for archiving and/or distributed replication based on the following criteria: uniqueness in the digital media asset and value invested in creating or modifying the digital media asset. An investment value ("IV") is determined by automatically observing the investment of time and effort that a user has put into a particular piece of media across all working sessions since it was last archived. Factors that contribute to IV include the number of actions performed, the complexity of those actions, and the amount of time a user was actively interacting with that file. A uniqueness value ("UV") is a value that represents the probability that a given media file is irreplaceable. Factors that contribute to UV are the format of the file, the kind of the original source media from which the file came, and what distribution actions have been taken with the file. In other words, a management media system prioritizes media archiving by automatically determining information by, at least in part, observing user actions.

A media management system may improve its understanding of what, when, and where digital media should be archived. A prioritization methodology is utilized to prioritize the digital media files based on importance to archive that which is most valuable immediately and delay the archiving of that which is less valuable to a later time when enough external storage and/or transfer bandwidth is available. To address data limits imposed by broadband providers, media management systems may spread the automatic archiving of lower priority media files over a period various time periods, e.g., days, weeks, or months. The prioritization methodology allows a media management system to automatically determine a media file's priority level with a degree of accuracy near that of a human.

As a result of utilizing the prioritization methodology, bandwidth costs may be lowered by reducing burst requirements, storage costs may be lowered by eliminating unnecessary replication, and media files may be more available. Further, a media management system may dynamically determine the additional bandwidth or storage hardware that will maintain a desired level of archive redundancy or availability. In addition, the prioritization methodology may be utilized to provide a metric to differentiate between lower and higher tiers of service.

Figure 1:
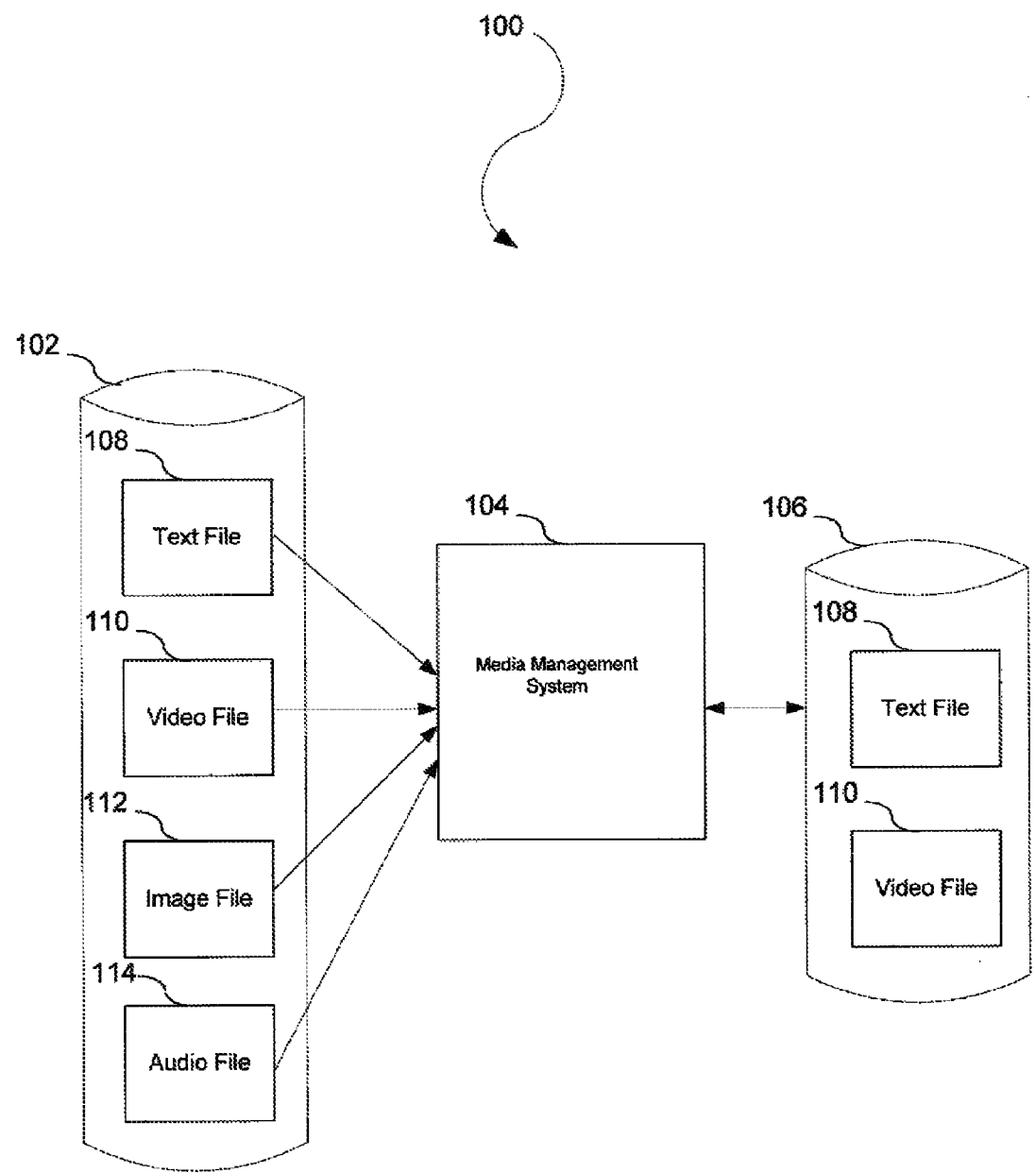
FIG. 1 illustrates an archival media management configuration.

FIG. 1 illustrates an archival media management configuration 100. In one embodiment, a storage device 102 is utilized to store a plurality of media files. Examples of media files include a text file 108, a video file 110, an image file 112, and an audio file 114. These examples are not exhaustive as various other types of media files and combinations, e.g., a video/audio file, may be stored. The storage device 102 may be operably connected to a computing device such as a personal computer ("PC"), laptop, tablet, smart phone, cell phone, personal media player, or the like. The storage device 102 may be operably connected to the computing device internally or externally.

A media management system 104 prioritizes the various media files stored on the storage device 102 for archiving. In other words, the media management system 104 assigns priorities to different media files such that the most valuable media files are stored more quickly than less valuable media files that are either stored more slowly or not stored at all. In one embodiment, the media management system utilizes the IV and the UV to perform the prioritization. The IV may be determined by automatically observing the investment of time and effort that a user has put into a particular piece of media across all working sessions since the media file was last archived if the media file was archived. As an example, an image file on which a user has performed several hundred painstaking brush actions while adding dozens of new layers over period of five hours has an extremely high probability of being more valuable to protect from potential loss than a similar image file to which a single brightening action was performed in two minutes.

The UV represents the probability that a media file is irreplaceable. As an example, an image file that is in RAW format and that was transferred to the computer from a Flash memory card reader where the media file was in a folder on a removable card that was labeled "DCIM" is highly likely to be the only original source file. Such a file should be prioritized very highly even if the IV remains zero because that file may likely be irrecoverable if lost. Further, as another example, a similar image file that is in the JPG format and which was transferred to a computer from an e-mail, shared network drive, or saved from a webpage is less likely to be irreplaceable and should be lower priority for scarce archiving resources, e.g., bandwidth and storage. However, if the first file with a very high UV is subsequently e-mailed in a high resolution, high quality format, or copied to a network drive or burned to a removable disc, the remaining local copy of the file would be assigned a lower UV.

In one embodiment, a weighting formula is utilized for the IV and UV. In other words, with respect to certain types of media files and/or certain conditions regarding the media files, the IV or UV may be weighted.

By utilizing the IV and UV values, a large queue of media files waiting to be archived may be become dynamic. In other words, some files move to the head of the list and the other files fall lower based on real-time observations of recent actions users have taken with those media files. As a result, scarce resources may be conserved while greatly reducing the risk of catastrophic loss. For example, the media management system 104 may analyze all of the media files stored in the storage device 102 and determine that the text file 108 has the highest total value based on the IV and UV. The media management system 104 may then determine that the video file 110 has the next highest total value, the image file 112 has the next total highest value, and the audio file 114 has the next total highest value. Based on available storage of the archival storage device 106, the archival storage device 106 may store the text file 108 and the video file 110. As space becomes available at a later time, the archival storage device 106 may be able to later archive the image file 112 and then possibly the audio file 114.

Various quantities of storage devices may be utilized in addition to the storage device 102. For example, a user may have multiple hard drives such as an internal hard drive and an external hard drive. Further, various quantities of archival storage devices may be utilized in addition to the archival storage device 106.

In one embodiment, IV and UV are additional data that is placed into metadata that is sent with a media file from the media management system 104 to the archival storage device 106. Accordingly, the determination of archiving on the archival storage device 106 may be performed at the media management system 104 or the archival storage device 106. In an alternative embodiment, the metadata is placed into a database. In yet another alternative, the metadata is placed into the operating system.

Figure 2:
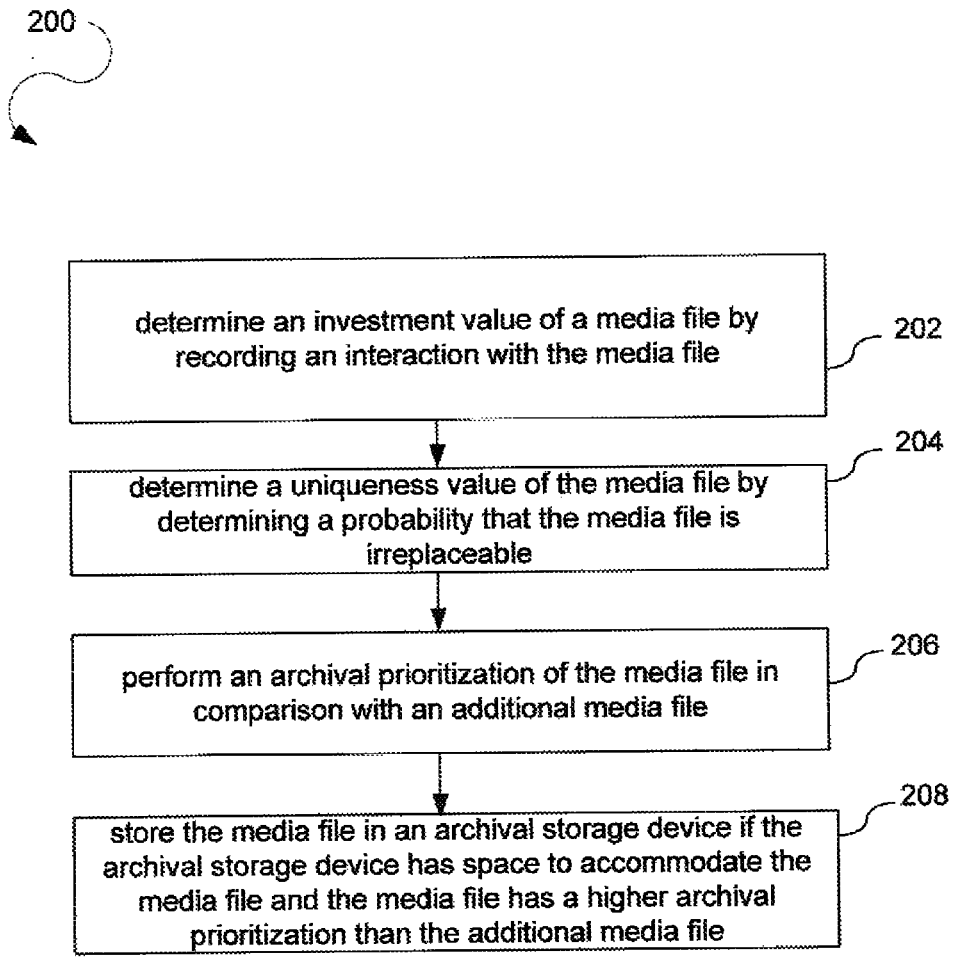
FIG. 2 illustrates a process that performs archival prioritization.

FIG. 2 illustrates a process 200 that performs archival prioritization. At a process block 202, the process 200 determines an investment value of a media file by recording an interaction with the media file. The determination may be automatic or manual. Further, at a process block 204, the process 200 determines a uniqueness value of the media file by determining a probability that the media file is irreplaceable. The determination may be automatic or manual. In addition, at a process block 206, the process 200 performs an archival prioritization of the media file in comparison with an additional media file. At a process block 208, the process 200 also stores the media file in an archival storage device if the archival storage device has space to accommodate the media file and the media file has a higher archival prioritization than the additional media file.

Figure 3:
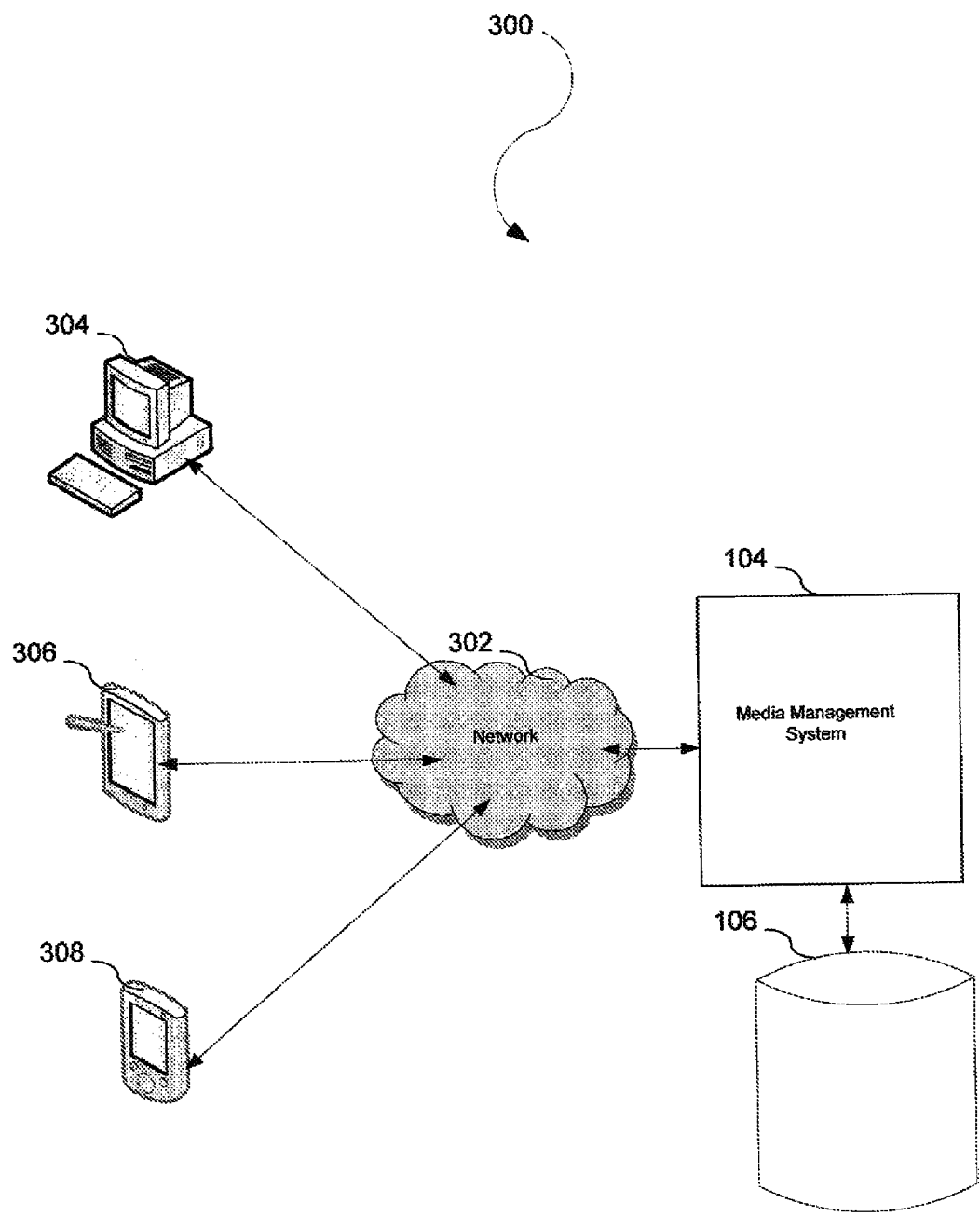
FIG. 3 illustrates a mesh network configuration.

FIG. 3 illustrates a mesh network configuration 300. A plurality of devices having a media file may be connected through a network 302. As examples, the plurality of devices may include a personal computer 304, a tablet device 306, and a smart phone 308. The media management system 104 may be utilized to determine if the media filed is stored on enough safe devices to go without being archived. If not, the media management system 104 finds another device, e.g., the archival storage device 106, that is connected to the network 302 on which to archive the media file.

Each of the files may be a node in the mesh network. A replication count may be determined for a particular file based on the sources on which the file is stored. As another example, a file may be stored in a secure database, a tablet device, and a digital picture frame. The secure database may have a safety value of 0.6, the tablet device may have a safety value of 0.2, and the digital picture frame may have a safety value of 0.1 for a total replication count of 0.9. A predetermined threshold is established. If the total replication count exceeds the predetermined threshold, then archiving is not utilized as the safety of the file is beyond the predetermined threshold. If the total replication count is below the predetermined threshold, archiving is utilized. The predetermined threshold may be established by a user. Alternatively, the predetermined threshold may be established by a system.

Figure 4:
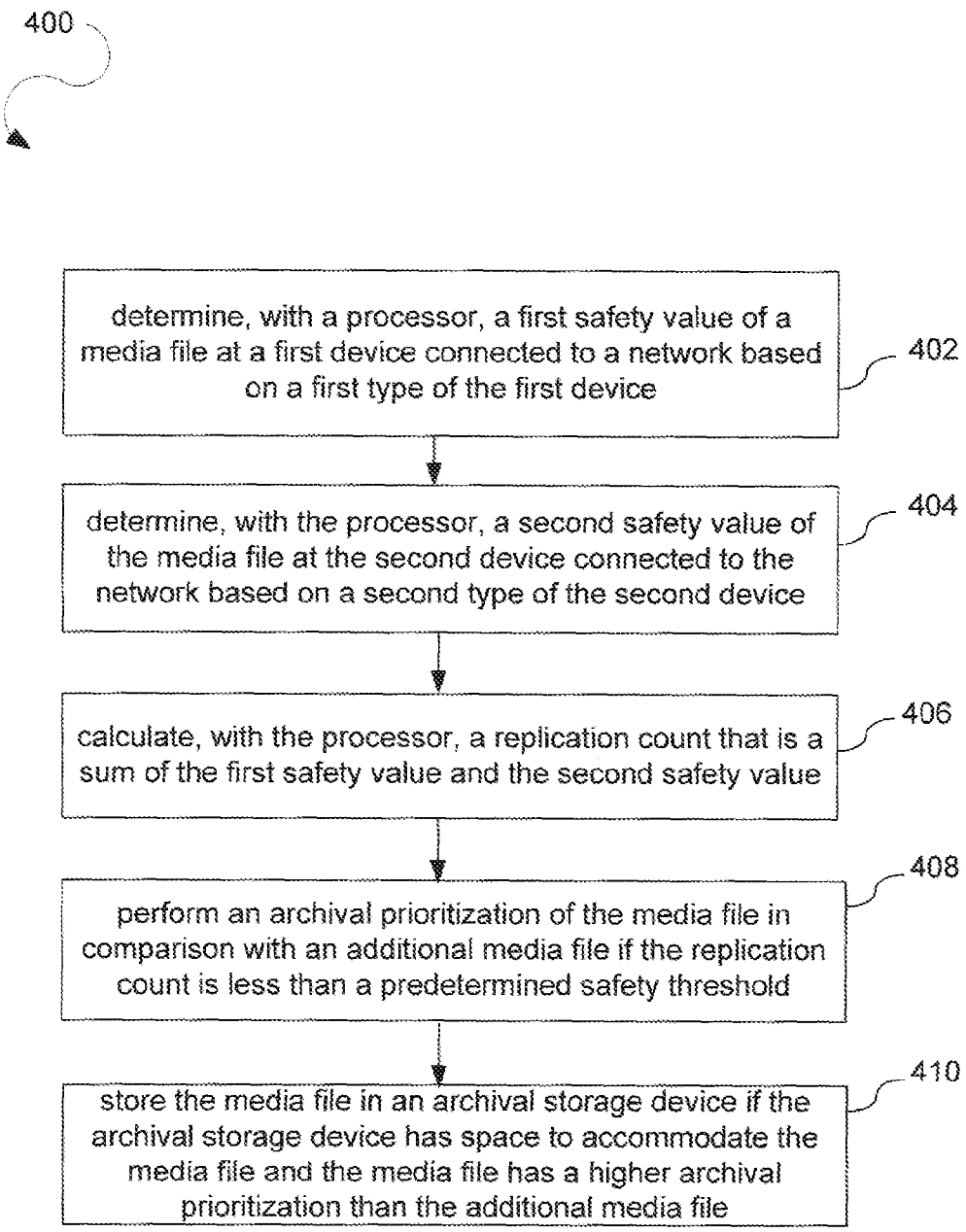
FIG. 4 illustrates a process that performs archival prioritization in a mesh network.

FIG. 4 illustrates a process 400 that performs archival prioritization in a mesh network. At a process block 402, the process 400 determines, with a processor, a first safety value of a media file at a first device connected to a network based on a first type of the first device. The determination may be automatic or manual. Further, at a process block 404, the process 400 determines, with the processor, a second safety value of the media file at the second device connected to the network based on a second type of the second device. The determination may be automatic or manual. In addition, at a process block 406, the process 400 calculates, with the processor, a replication count that is a sum of the first safety value and the second safety value. At a process block 408, the process 400 performs an archival prioritization of the media file in comparison with an additional media file if the replication count is less than a predetermined safety threshold. Further, at a process block 410, the process 400 stores the media file in an archival storage device if the archival storage device has space to accommodate the media file and the media file has a higher archival prioritization than the additional media file.

In an alternative embodiment, mobile app files may be prioritized for archival. For example, a more expensive app that the user paid a higher price for may have a higher priority than a less expensive app for which the user paid less.

In yet another embodiment, IV and UV are utilized in a mission critical system to automatically make one or more additional copies of the highest value content in addition to the archival process of all files. In one embodiment, the one or more additional copies may be optionally stored off-site, in a secure facility, or the like.

In another embodiment, UV may be utilized to traverse available network locations on other computers in an enterprise as well as inventory listings of centralized asset management tools to recognize files that, based on size, date, and/or checksum, may be identical to the local file. Accordingly, the UV may be lowered and archiving resources may be shifted to other more at-risk files. On an enterprise scale, such a system may have a control architecture that permits administrators to manage the system to target IV/UV metrics. Conversely, such a system may also determine how many additional system resources would be utilized to reach the desired IV/UV levels.

Figure 5:
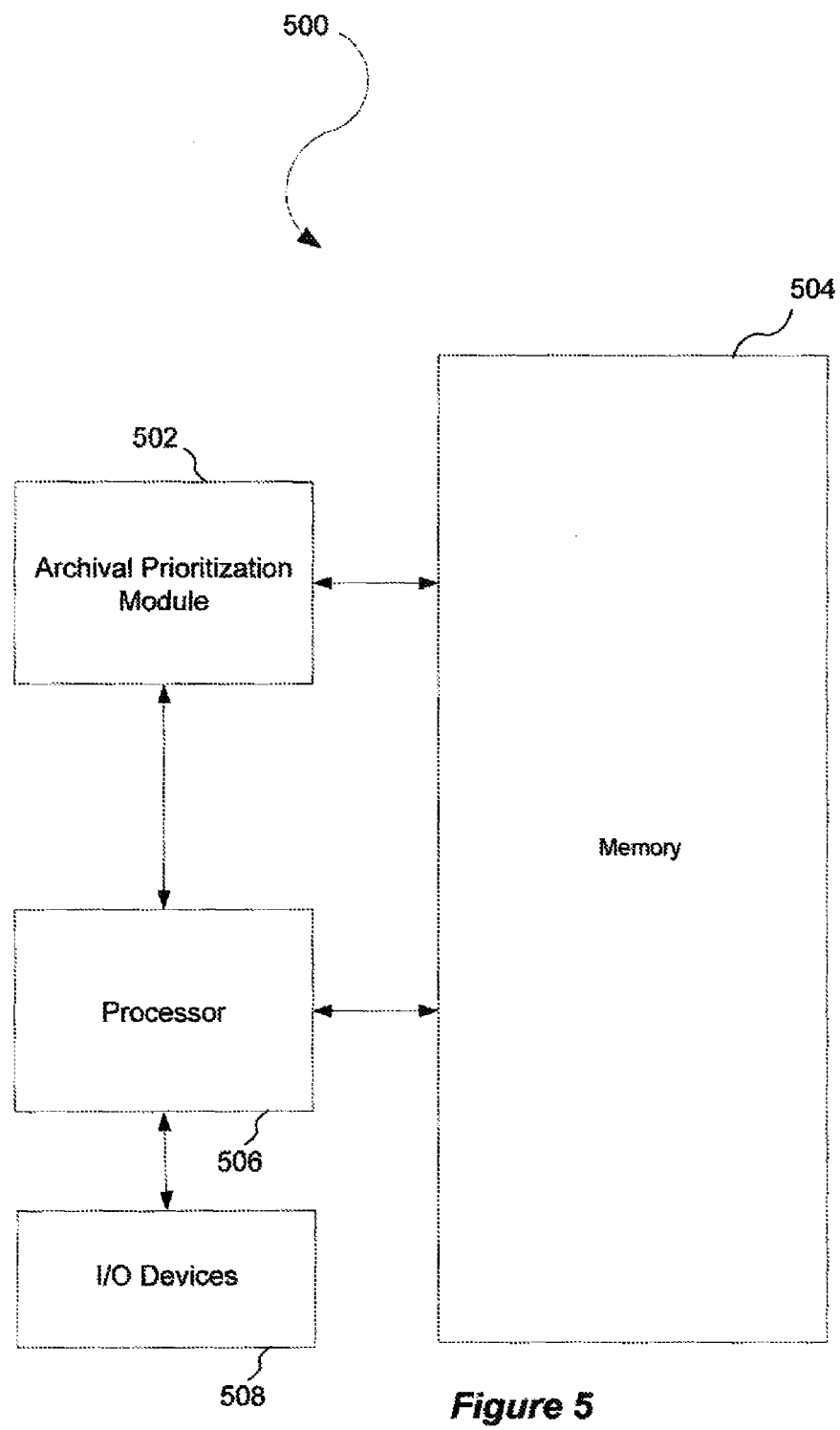
FIG. 5 illustrates a system configuration that may be utilized for archival prioritization.

FIG. 5 illustrates a system configuration 500 that may be utilized for archival prioritization. In one embodiment, an archival prioritization module 502 interacts with a memory 504. In one embodiment, the system configuration 500 is suitable for storing and/or executing program code and is implemented using a general purpose computer or any other hardware equivalents. The processor 506 is coupled, either directly or indirectly, to the memory 504 through a system bus. The memory 504 can include local memory employed during actual execution of the program code, bulk storage, and/or cache memories which provide temporary storage of at least some program code in order to reduce the number of times code must be retrieved from bulk storage during execution.

The Input/Output ("I/O") devices 508 can be coupled directly to the system configuration 500 or through intervening input/output controllers. Further, the I/O devices 508 may include a keyboard, a keypad, a mouse, a microphone for capturing speech commands, a pointing device, and other user input devices that will be recognized by one of ordinary skill in the art. Further, the I/O devices 508 may include output devices such as a printer, display screen, or the like. Further, the I/O devices 508 may include a receiver, transmitter, speaker, display, image capture sensor, biometric sensor, etc. In addition, the I/O devices 508 may include storage devices such as a tape drive, floppy drive, hard disk drive, compact disk ("CD") drive, etc. Any of the modules described herein may be single monolithic modules or modules with functionality distributed in a cloud computing infrastructure utilizing parallel and/or pipeline processing.

Network adapters may also be coupled to the system configuration 500 to enable the system configuration 500 to become coupled to other systems, remote printers, or storage devices through intervening private or public networks. Modems, cable modems, and Ethernet cards are just a few of the currently available types of network adapters.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above.

It should be understood that the processes and systems described herein can take the form of entirely hardware embodiments, entirely software embodiments, or embodiments containing both hardware and software elements. If software is utilized to implement the method or system, the software can include but is not limited to firmware, resident software, microcode, etc.

It is understood that the processes and systems described herein may also be applied in other types of processes and systems. Those skilled in the art will appreciate that the various adaptations and modifications of the embodiments of the processes and systems described herein may be configured without departing from the scope and spirit of the present processes, systems, and computer program products. Therefore, it is to be understood that, within the scope of the appended claims, the present processes, systems, and computer program products may be practiced other than as specifically described herein.

I claim:

1. A tangible computer-readable storage medium comprising program instructions that responsive to execution on a computer, cause the computer to perform operations comprising:
   determining an investment value of a media file that is representative, in part, of investment in editing the media file, the investment value determined by recording interaction with the media file and ascertaining a frequency and a complexity of editing operations performed on the media file, the complexity based, in part, on how many different types of editing operations are performed on the media file;
   determining a uniqueness value of the media file by determining a probability that the media file is irreplaceable based, in part, on at least one of a type of original source media file and distribution actions performed with the media file;
   assigning an archival priority to the media file based on a comparison of the media file to an additional media file, the archival priority assigned to the media file being higher than an archival priority of the additional media file if the investment value and uniqueness value of the media file are higher than an investment value and uniqueness value of the additional media file; and
   storing the media file in an archival storage device if the archival storage device has space to accommodate the media file, a replication count indicating a combined safety level of one or more storage devices storing the media file is below a predetermined threshold, and the media file has a higher archival priority than the additional media file.

2. The tangible computer-readable storage medium of claim 1, wherein the investment value is based on a quantity of actions performed in the interaction with the media file.

3. The tangible computer-readable storage medium of claim 1, wherein the investment value is based on a time value of the interaction with the media file.

4. The tangible computer-readable storage medium of claim 1, wherein the uniqueness value is based on a format of the media file.

5. The tangible computer-readable storage medium of claim 1, wherein the uniqueness value is based on the type of original source media file.

6. The tangible computer-readable storage medium of claim 1, wherein the uniqueness value is based on the distribution actions performed with the media file.

7. The tangible computer-readable storage medium of claim 1, wherein the operations further comprise generating metadata for the media file that indicates the investment value and the uniqueness value.

8. The tangible computer-readable storage medium of claim 1, wherein the media file has been purchased for a price and the investment value is based, in part, on the price.

9. The tangible computer-readable storage medium of claim 1, wherein the operations further comprise editing the media file by performing one or more modification actions on the media file that are specified by a user to modify the media file.

10. The tangible computer-readable storage medium of claim 1, wherein the media file is stored on a node in a mesh network.

11. A computer-implemented method comprising:
    determining a first safety value of a first device that stores a media file and is connected to a network, the first safety value being based on a first type of the first device, a safety value for a device type being higher than a safety value for another device type that is designated as being less safe;
    determining a second safety value of a second device that stores the media file and is connected to the network, the second safety value being based on a second type of the second device;
    calculating a replication count that is a sum of the first safety value and the second safety value;
    determining an investment value of the media file that is representative, in part, of investment in editing the media file, the investment value determined by recording interaction with the media file and ascertaining a frequency and a complexity of editing operations performed on the media file;
    determining a uniqueness value of the media file by determining a probability that the media file is irreplaceable;
    assigning an archival priority to the media file based on a comparison of the media file to an additional media file if the replication count is less than a predetermined safety threshold, the archival priority assigned to the media file being higher than an archival priority of the additional media file if the investment value and uniqueness value of the media file are higher than an investment value and uniqueness value of the additional media file; and
    initiating storage of the media file in an archival storage device if it is determined that the archival storage device has space to accommodate the media file and the media file has a higher archival priority than the additional media file.

12. The computer-implemented method of claim 11, wherein the archival storage device is a third device connected to the network that is associated with a third safety value such that the replication count added to the third safety value equals or exceeds the predetermined safety threshold.

13. The computer-implemented method of claim 11, wherein the first device is a node in the network and the second device is an additional node in the network.

14. The computer-implemented method of claim 11, further comprising calculating the predetermined safety threshold.

15. The computer-implemented method of claim 11, further comprising receiving an input that specifies the predetermined safety threshold.

16. A system comprising:
    one or more processors; and
    one or more tangible computer-readable storage media storing instructions that are executable by the one or more processors to implement an archival prioritization module configured to:
    determine an investment value of a media file that is representative, in part, of investment in editing the media file, the investment value determined by ascertaining a frequency and a complexity of editing operations performed on the media file by a user, the complexity based, in part, on how many different types of editing operations are performed by the user;
    determine a uniqueness value of the media file by determining a probability that the media file is irreplaceable based, in part, on at least one of a type of original source media file and distribution actions performed with the media file; and
    assign an archival priority to the media file based on a comparison of the media file to an additional media file, the archival priority assigned to the media file being higher than an archival priority of the additional media file if the investment value and uniqueness value of the media file are higher than an investment value and uniqueness value of the additional media file; and an archival storage device configured to store the media file if the archival storage device has space to accommodate the media file, a replication count indicating a combined safety level of one or more storage devices storing the media file is below a predetermined threshold, and the media file has a higher archival priority than the additional media file.

17. The system of claim 16, wherein the archival prioritization module is further configured to generate metadata for the media file that indicates the investment value and the uniqueness value.

18. The system of claim 17, wherein the archival storage device is further configured to receive the metadata generated by the archival prioritization module with the media file.

19. The system of claim 16, wherein the media file is a node in a mesh network.

* * * * *